United States Patent
Kupferman

[11] Patent Number: 5,940,240
[45] Date of Patent: Aug. 17, 1999

[54] CONSTANT VELOCITY SERVO LINEARITY CALIBRATION METHOD FOR MR HEAD

[75] Inventor: Hanan Kupferman, Diamond Bar, Calif.

[73] Assignee: Western Digital Corporation, Irvine, Calif.

[21] Appl. No.: 08/921,398

[22] Filed: Aug. 29, 1997

[51] Int. Cl.$^6$ .................................................. G11B 5/596
[52] U.S. Cl. ..................................... 360/77.08; 360/77.02
[58] Field of Search ...................................... 360/75, 77.01, 360/77.02, 77.04, 77.07, 77.08, 77.11, 78.04, 78.06, 78.14; 364/571.01

[56] References Cited

U.S. PATENT DOCUMENTS

| | | | |
|---|---|---|---|
| 5,117,408 | 5/1992 | Weispfenning et al. | 369/32 |
| 5,500,776 | 3/1996 | Smith | 360/77.04 |
| 5,566,095 | 10/1996 | Cameron et al. | 364/571.01 |
| 5,576,909 | 11/1996 | Dierkes et al. | 360/78.09 |
| 5,587,850 | 12/1996 | Ton-that | 360/77.08 |
| 5,602,693 | 2/1997 | Brunnett et al. | 360/77.08 |
| 5,760,990 | 6/1998 | Ukani et al. | 360/77.04 |
| 5,777,816 | 7/1998 | Hampshire et al. | 360/77.08 |

*Primary Examiner*—Andrew L. Sniezek
*Attorney, Agent, or Firm*—Leo J. Young, Esq.; Milad G. Shara, Esq.

[57] ABSTRACT

The invention is a method of calibrating a position error signal (PES) to overcome the problem of a measured displacement or PES that varies as a non-linear function of real displacement when the read transducer is positioned to either side of a null position where the PES equals zero. The PES is notably nonlinear while reading servo burst information with a Magneto-Resistive (MR) head which has nonlinear magnetic characteristics. The method uniquely calibrates the measured PES to provide a corrected PES by measuring the PES while slowly moving the MR head at a constant radial velocity, determining the actual displacement corresponding to each measured PES, and comparing the measured PES with the ideal PES for the corresponding displacement to develop a correction table for providing a corrected PES when given a measured PES. The method uniquely relies on the standard servo burst data and may, therefore, be performed at anytime without need for a servowriter or any sort of special calibration track.

6 Claims, 10 Drawing Sheets

FIG. 6a  IDEAL

FIG. 6b  ACTUAL MEASURED

CONSTANT VELOCITY SERVO LINEARITY CALIBRATION METHOD FOR MR HEAD

BACKGROUND OF THE INVENTION

1. Field of the Invention

The present invention relates generally to rotating disk drives and, more particularly, to a method of calibrating a position error signal (PES) for accurately moving a transducer head in partial track increments from a track center position at which the PES equals zero, for example, and where the PES varies as a nonlinear function of real displacement due to a non-linear response characteristic of the head.

2. Description of the Related Art

A conventional disk drive has a head disk assembly ("HDA") including at least one magnetic disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

The industry presently prefers a "rotary" or "swing-type" actuator assembly which conventionally comprises an actuator body that rotates on a pivot assembly between limited positions, a coil that extends from one side of the actuator body to interact with one or more permanent magnets to form a voice coil motor, and an actuator arm that extends from the opposite side of the actuator body to support the HGA.

Each surface of each disk conventionally contains a plurality of concentric data tracks angularly divided into a plurality of data sectors. In addition, special servo information is provided on this disk or another disk to determine the position of the head. The most popular form of servo is called "embedded servo" wherein the servo information is written in a plurality of servo sectors that are angularly spaced from one another and interspersed between data sectors around the track. Each servo sector generally comprises a track identification (ID) field and a group of servo bursts (an alternating pattern of magnetic transitions) which the servo control system samples to align the transducer head with or relative to a particular data track. The servo control system moves the transducer toward a desired track during a coarse "seek" mode using the track ID field as a control input. Once the transducer head is generally over the desired track, the servo control system uses the servo bursts to keep the transducer head over that track in a fine "track follow" mode. The transducer generally reads the servo bursts to produce a position error signal (PES) that is 0 when the transducer is at a particular radial position. The position where the PES=0 may or may not be at the data track center, however, depending on the magnetic characteristics of the transducer, the arrangement of the servo bursts, and the formula used to calculate the PES.

For many years, the industry has used single-gap inductive thin film heads where the same transducer or gap is used for reading and writing. More recently, however, the industry has begun using a Magneto-Resistive head which requires two separate transducers—an inductive transducer for writing and a Magneto-Resistive transducer for reading. An MR head offers an advantage over an inductive head in the recovery of data in disk drives requiring high areal density. However an MR head also presents a number of disadvantages. In particular, the separate read and write transducers are necessarily spaced apart from one another along the length of the supporting structure known as a "slider." As a result, their radial separation varies as the head is moved over the disk by a swing-type actuator.

This phenomenon generally requires separate and distinct track following procedures for reading and writing. For writing, for example, the read transducer track follows at the "null" position where the PES=0 and the write transducer records the data track offset by the amount of radial separation between the read and write transducers at this cylinder. For reading, therefore, the read transducer is "micro-jogged" away from the null position in order to align the read transducer with the data track, i.e. it track follows off-null at a position where the PES≠0.

The jogging process can be troublesome, however, because the PES produced by the Magneto-Resistive transducer does not vary in linear proportion to the displacement from the position where the PES=0. This non-linear signal-to-displacement characteristic is a well known problem, but the solutions to date have a number of drawbacks as discussed below.

One known approach to calibrating the PES signal relative to displacement relies on a device called a servowriter. The servowriter is basically a jig which mounts a HDA and then mechanically moves the heads to a given reference position under control of a precision laser guided measurement system. The HDA is then driven to write the servo track information for that position. The process is repeated for as many incremental movements of the heads as are required to write all tracks across the disk. During this process, the actual displacement x from a position where the PES=0 is known while using the servowriter. This makes it relatively easy to measure the system gain as a function of the actual displacement x to generate a calibration factor. Unfortunately however, a servowriter is a very expensive piece of machinery, costing $100,000.00 or more and using this process for calibrating system gain increases the time spent by the HDA in a servowriter which adversely impacts production time and cost. Finally, it is undesirable to calibrate the PES using a servowriter because the calibration must be performed before the detailed self calibration process which the disk drive performs later in the manufacturing cycle. This is a significant disadvantage because the parameters of the servo channel may change due to adjustments in DC bias current applied to the MR transducer or other factors. Accordingly, the calibrations made with the servo writer may become inaccurate or entirely invalid.

Another approach known to this inventor involves using the servowriter to record a special "calibration track" on each surface of each disk wherein a plurality of burst pairs define null points that are radially shifted from one another by precise, predefined, fractional track amounts that collectively provide accurate information about real displacement. Such a calibration track beneficially allows for calibrating the PES signal after the drive is removed from the servowriter. Unfortunately, however, the special calibration tracks take additional time on the servowriter and occupy valuable space on the disk that could be used for data. Moreover, due primarily to the variable head skew, a special calibration track may provide inaccurate correction information when the head is no longer in the region containing the calibration track. This shortcoming to calibration tracks may detrimentally require that each disk contain more than one region having calibration tracks, occupying even more space that could otherwise be used for data.

Accordingly, there is a need for a method of calibrating the response of the MR head which does not require a servowriter and which may be performed whenever the disk drive requires detailed calibration without requiring special calibration tracks.

SUMMARY OF INVENTION

The invention is a method of calibrating a nonlinear output signal generated by a transducer head in a magnetic disk drive to displacement of the transducer head relative to a data track center of a data track containing standard servo data. The method follows the steps of: positioning a transducer head on a track center of a first data track such that the PES produced by reading standard servo data included in the data track is zero; moving the transducer head at a constant velocity of radial movement over a plurality of data tracks from the track center of the first data track to a track center of a second data track, the constant velocity being sufficiently slow in relation to the rotational speed of the disk that the transducer head repeatedly passes over the standard servo data included in each of the plurality of data tracks located between the track center of the first data track and the track center of the second data track; tracking the passage of time; determining the constant velocity of radial movement; identifying a plurality of transducer head positions between the track center of the first data track and the track center of the second data track based on the passage of time and the determined velocity of radial movement; measuring nonlinear output signals generated by the transducer head at the plurality of transducer head positions; comparing the nonlinear output signals to desired signals at the plurality of transducer head positions; and generating a correction table for use in determining an actual position of the transducer head relative to a data track center given only the nonlinear output signal.

Preferably, the method of determining the constant velocity of radial movement comprises dividing a distance value corresponding to a distance traversed by the transducer head at it was moved between the track center of the first data track and the track center of the second data track by a time value corresponding to the passage of time. The method also preferably comprises the step of compensating for a time needed for the transducer head to ramp up to the constant velocity by positioning the transducer head in advance of the first data track.

The step of moving the transducer head at a constant velocity of radial movement further preferably comprises the steps of generating a desired speed command; integrating the desired speed command to provide a velocity feedback signal that is proportional to the velocity of the actuator and the transducer head; and subtracting the velocity feedback signal from the desired speed command in a feedback loop to maintain the constant velocity.

In another view, the invention can be defined as a method of calibrating a nonlinear output signal generated by a transducer head in a magnetic disk drive to displacement of the transducer head relative to a data track center of a data track containing standard servo data comprising the steps of moving the transducer head over a plurality of tracks at a constant velocity of radial movement that is sufficiently slow in relation to the rotational speed of the disk that the transducer head repeatedly passes over the standard servo data included in the data track; tracking the passage of time; determining the constant velocity of radial movement; identifying a plurality of transducer head positions relative to a track center of each of the plurality of tracks based on the passage of time and the determined constant velocity of radial movement; measuring nonlinear output signals generated by the transducer head at the plurality of transducer head positions; comparing the nonlinear output signals to desired signals at the plurality of transducer head positions; and generating a correction table for use in determining an actual position of the transducer head relative to a data track center given only the nonlinear output signal.

BRIEF DESCRIPTION OF THE DRAWINGS

The just summarized invention may best be understood with reference to the Figures of which.

BRIEF DESCRIPTION OF THE PREFERRED EMBODIMENTS

Figure 1:
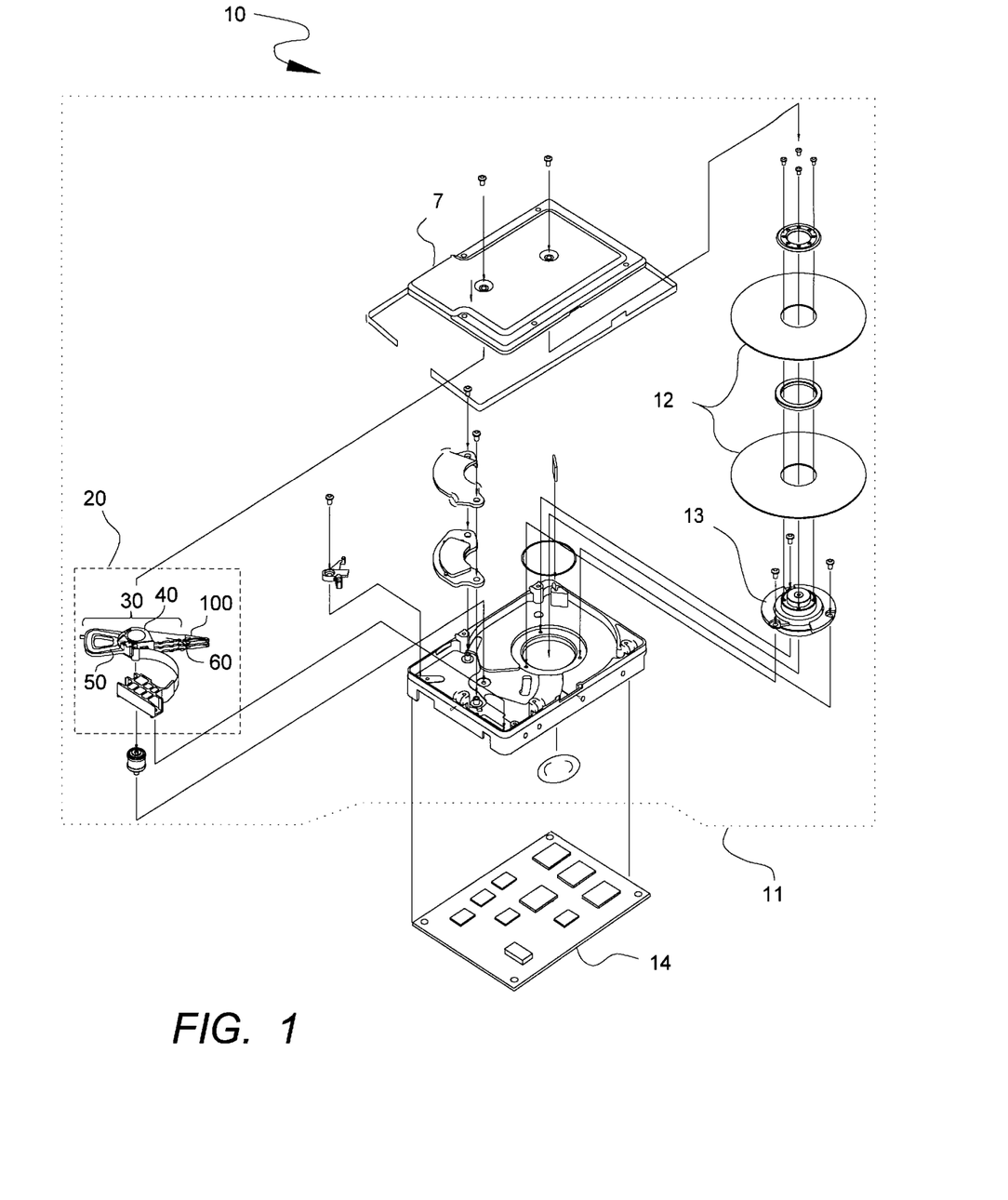
FIG. 1 is an exploded perspective view of a magnetic disk drive 10 having a head disk assembly 11 ("HDA") including a head stack assembly 20 ("HSA") which carries a Magneto-Resistive transducer over concentric data tracks and associated servo bursts on the surface of a disk 12.

FIG. 1 shows the principal components of a disk drive 10 in which a PES calibration according to the present invention may be implemented. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a head 140 (see FIG. 1A) over the disk 12.

The head stack assembly 20 is located so that the head 140 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 140 for each surface of each disk 12, the head gimbal assemblies 100 supported by multiple actuator arms 60.

Figure 1A:
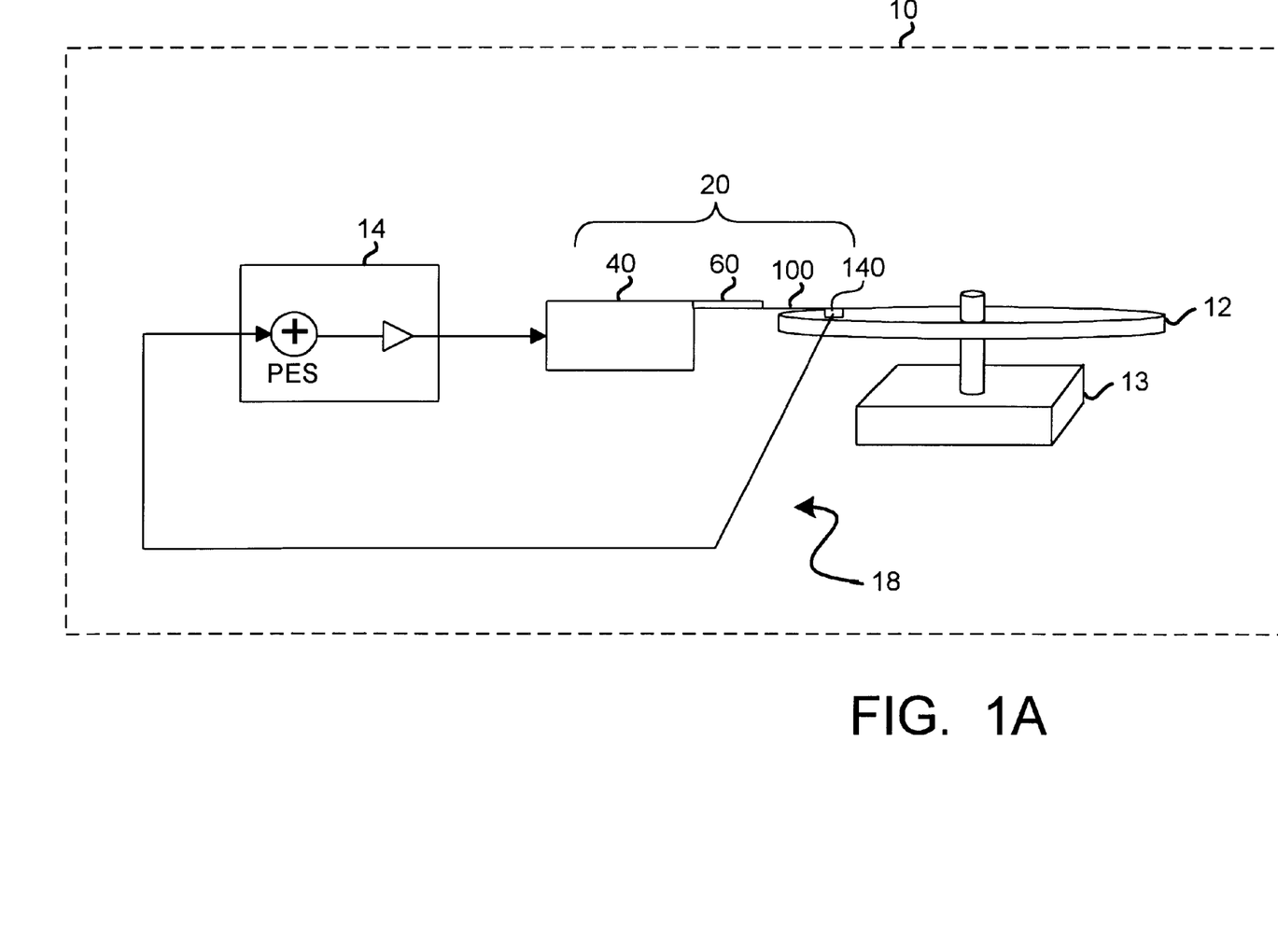
FIG. 1A is a schematic, block diagram of a servo control loop 18 used to position a transducer head 140 over a surface of a disk 12 in the disk drive 10 of FIG. 1.

FIG. 1A is a schematic, block diagram of a servo control loop 18 used to position a transducer head 140 over a surface of a disk 12 in the disk drive 10 of FIG. 1. As suggested therein, servo electronics within the controller circuit board 14 control the actuator 20 based on servo signals fed back from the transducer head 140. A detailed description of the servo control loop is unnecessary because its general operation is well known in the industry.

As explained above, a sampled servo or sectored servo is presently preferred. In such an arrangement, groups or "bursts" of magnetic transitions are recorded in a radially displaced fashion within a servo sector. Where two bursts are used per data track, the servo bursts are usually designated as the "A" burst and the "B" burst. The radial displacement in such case places the A burst to one side of the data track centerline and the B burst to the other side. The A and B bursts are displaced from one another in terms of angular position such that the head passes over the A burst and then over the B burst. If the head is aligned with the data track centerline, then the head will pass over equal amounts of the A and B bursts and the servo electronics will develop a Position Error Signal (PES) equal to zero. If the head is displaced from the centerline, then the head will pass over more of the A burst or over more of the B burst so that the PES will be nonzero, the sign of the PES indicating the direction of displacement. The PES is used by the servo electronics to attain and then maintain a desired position.

The separation of the read and write heads in a magnetoresistive (MR) transducer has made it necessary to purposely track follow away from the null position where the PES=0. Unfortunately, however, the MR head, which detects the servo bursts, is nonlinear such that the measured displacement (PES) does not directly correspond to the real displacement as the read head is moved away from the null point. This nonlinear response makes it necessary to calibrate the PES as a function of real displacement in order to accurately position the MR head on either side of the null position. The calibration method of this inventor is uniquely accomplished by moving the MR head at a constant radial velocity, measuring the gain or value of the PES signal at each of a plurality of equally spaced positions, determining those positions and comparing the measured gain with an ideal gain to develop a correction function. The method may be understood with reference to the following sections taken together with the drawings.

I. Theory

Figure 2:
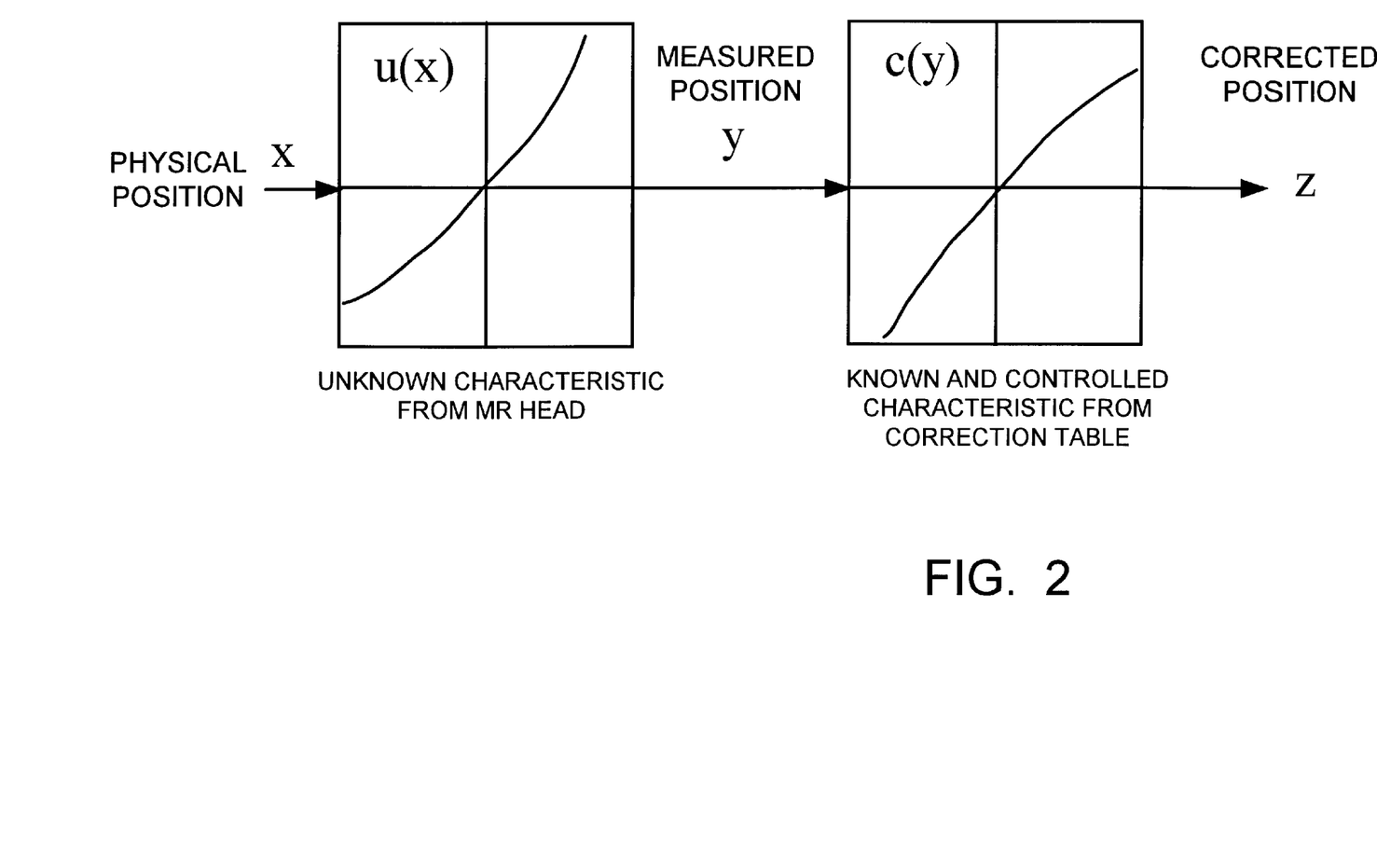
FIG. 2 is a theoretical diagram showing how an MR head which produces a PES or measured displacement y that varies as a non-linear function u(x) of actual displacement x may be corrected using a correction function c(y) to provide a corrected displacement z which varies substantially as a linear function of the actual displacement x.

The following explanation relates to FIG. 2. As suggested at the left side thereof, if x is the real displacement from a null position where the PES equals zero and y is a measured PES, then there is some relationship between y and x which we can characterize as:

$$y = u(x) \quad (1)$$

In a read channel using a Magneto-Resistive read transducer, however, the relationship between real displacement x and measured PES y is nonlinear as suggested by FIG. 2. This is largely due to the asymmetrical, nonlinear magnetic characteristics of the MR head. We can, however, produce a corrected PES z by applying a correction function c(y) to the measured PES y:

$$z = c(y)$$

Figure 3:
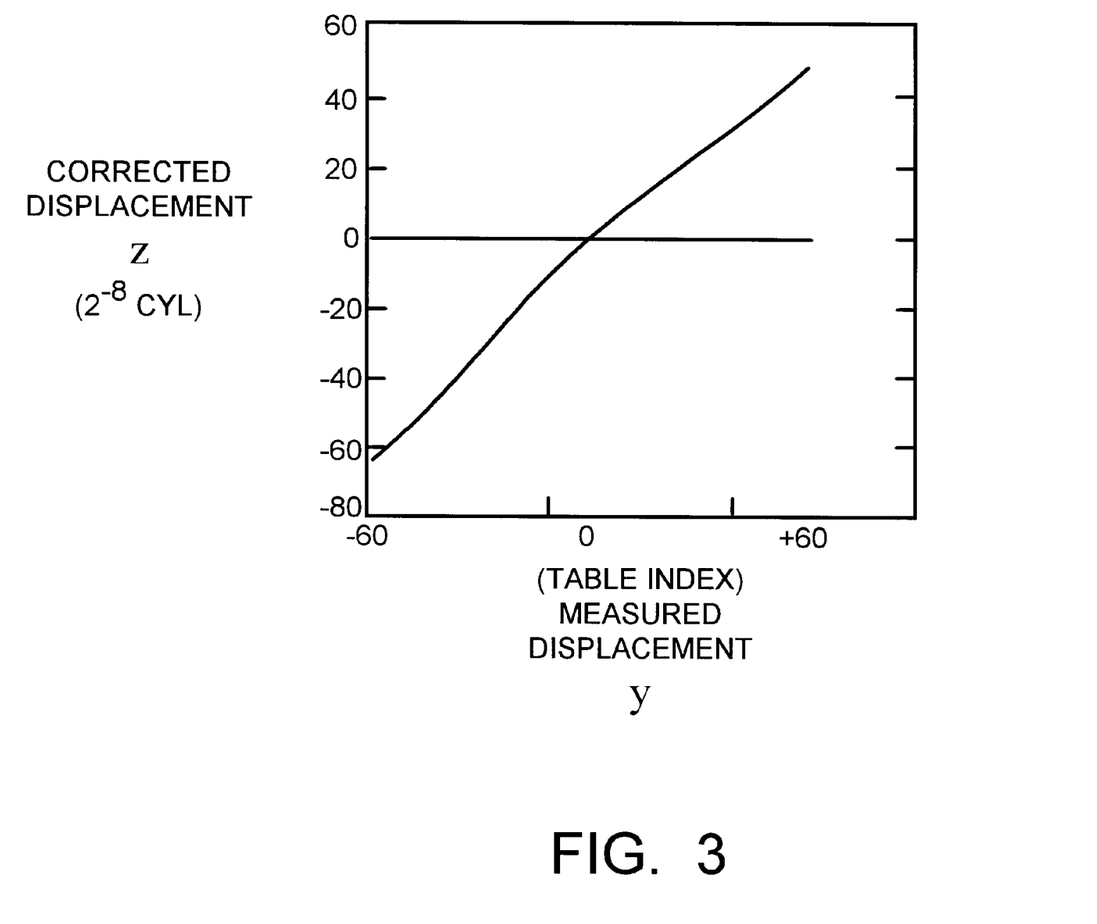
FIG. 3 is a graph representing values in a correction table which implements a correction function c(y) as shown in FIG. 2 wherein the horizontal index to the correction table is the measured displacement y in fractional track increments to either side of a null position of where the measured displacement y is zero and the vertical output of the table is the corrected displacement z in fractional track increments.

The correction function c(y) of the present invention is not implemented as a continuous mathematical function, however, but rather as a discrete valued correction table like that exemplified by FIG. 3. The correction table of FIG. 3, expressed in the form of a graph, corresponds to a disk drive system wherein each track is resolved into 256 discrete position units and wherein the measured displacements y of interest for micro-jogging are only about ±60 position units from track center. It is possible, however, to implement the present invention in a system that resolves each track to a finer or coarser degree, and to provide a wider, or narrower, range of interest for micro-jogging.

The correction table is "experimentally" developed by making a plurality of PES measurements y at a corresponding plurality of equally spaced displacements x. The equally spaced displacements x are initially unknown, but ultimately determined. After obtaining this data, it is relatively straightforward process to develop the correction table by comparing each measured PES y with an ideal PES z for each known displacement x. In other words, a correction table entry for a given displacement x equals the difference between the ideal PES z and the measured PES y, i.e. z−y.

It should be understood that the present invention is absolutely unlike the prior art calibration methods that use a servowriter or special calibration tracks to seek the head to a plurality of displacements x that are known, a priori, and take a corresponding plurality of measured PES values y. Instead, the present invention uniquely gathers measured PES values y while slowly moving the head at constant speed and then, after the measurements have been obtained, determines and correlates actual displacements x with the measured PES values y. The present invention uniquely determines the actual displacements x based on the distance traveled, the time elapsed, and the equal spacing between measured PES values y provided by the constant speed. Of particular significance, the present invention can operate with standard servo burst data.

II. Operation

Figure 4:
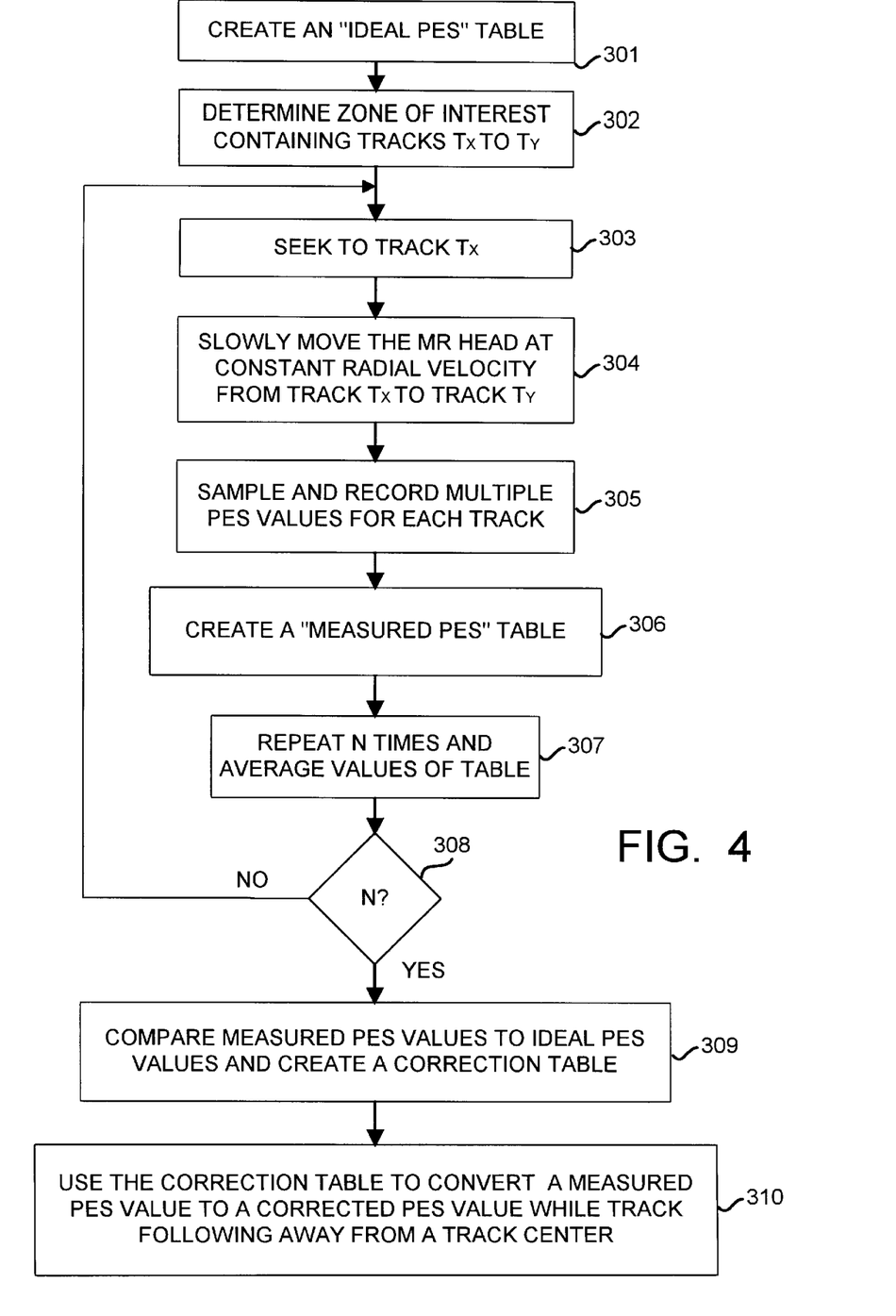
FIG. 4 is a flow chart illustrating a preferred method of calibration in accordance with the present invention.

FIG. 4 is a flow chart illustrating the presently preferred steps of the constant velocity calibration method of the present invention.

The first step 301 establishes a plurality of ideal PES values z for a corresponding plurality of MR head displacements x from a track center position. The ideal PES values z may be specified in a continuous mathematical formula or, as is presently preferred, by a plurality of discrete values contained in an "Ideal PES Table". In the latter case, the Ideal PES Table should provide sufficient granularity to match the system's finest resolution in order to ensure that an ideal PES value z may be correlated with a nearest-most measured PES values y, as described below.

The second step 302 involves determining a "zone of interest" corresponding to predetermined location on the disk 12 and containing a predetermined number of tracks defined as track $T_X$ to track $T_Y$ where x any y are specific track numbers (e.g. tracks $T_{100}$ to $T_{110}$, $T_{1250}$ to $T_{1280}$, ...). This step permits the method to generate different calibrations for different regions of the disk and permits a variable range of tracks. It might be desired in a drive having 10,000 tracks, for example, to calibrate at the Outer Diameter of the disk (OD) (i.e. from $T_0$ to $T_{10}$), in the middle (i.e. from $T_{5000}$ to $T_{5010}$), and at the Inner Diameter (ID) (i.e. from $T_{9990}$ to $T_{10000}$).

In step 303, the servo electronics 14 causes the head 140 to seek to the first track $T_X$ in the range of interest, $T_X$ to $T_Y$.

In step 304, the servo electronics 14 cause the head 140 to slowly move at constant radial velocity from Track $T_X$ to Track $T_Y$. The velocity should be slow enough that the head 140 passes over several servo bursts in a single track before it moves to an adjacent track. A slow speed increases the measurement resolution by gathering more data points for a given track.

For example, moving the head 140 at a velocity which traverses 16 tracks per revolution, would produce only 5 data points per track on a typical 80 sector disk (80/16=5). A typical disk has a track density of 10,000 TPI and spins at 5,000 RPM for one revolution every 12 mSec. Moving the head 16 tracks per revolution, therefore, corresponds to moving the head only 16/10,000th of an inch in one 12 mSec revolution, a velocity of only about 0.133 inches per second. Moving the head only 8 tracks per revolution would produce more data points, 10 per track (80/8=10), but would require a proportionally slower velocity of about 0.066 inches per second. The slower the velocity, the more data points gathered per track.

Figure 5:
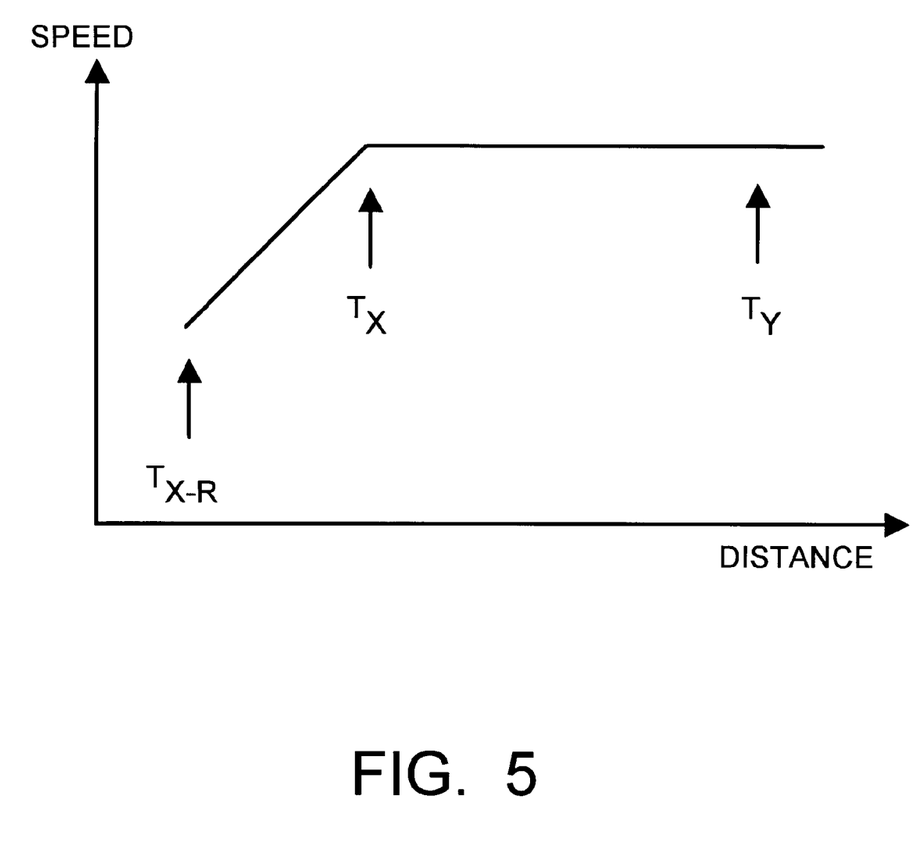
FIG. 5 is a diagram of speed versus distance showing how the head may be positioned at track $T_{X-R}$ so that it comes up to constant speed by the time it enters the region of interest from track $T_X$ to track $T_Y$.

Steps 303 and 304 are preferably modified to account for the fact, as shown in FIG. 5, that it takes some time/distance for the MR head 140 to come up to speed. In particular, it may be desirable to position the MR head near Track $T_X$, rather than directly to that track, so that the MR head 140 is moving at constant velocity as it crosses over Track $T_X$. The number of tracks "r" needed to reach constant velocity would vary from drive model to drive model, but should be in the range of about 10 to 20 tracks. Accordingly, if the desired range is $T_X$ to $T_Y$, the servo electronics should seek the MR head 140 to Track $T_{X-R}$ in step 303 so that the MR head 140 is guaranteed to be moving at constant velocity from $T_X$ to $T_Y$ in step 304.

Figure 6A:
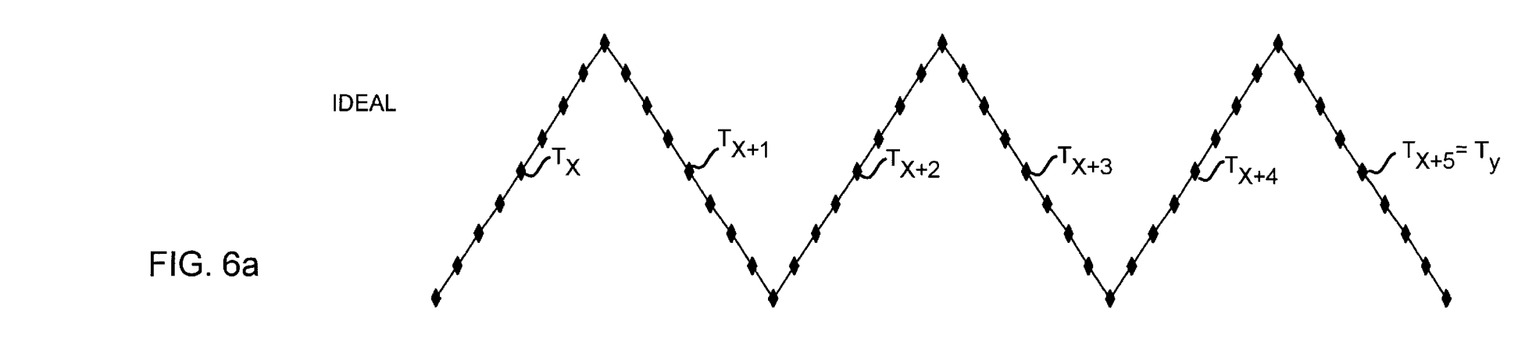
FIGS. 6(a), 6(b), and 6(c) are simplified diagrams showing the relationship between ideal PES values z, the measured PES values y, and the equally spaced sampling intervals that occur after the head is ramped-up to speed and moving at constant speed over the region of interest from track $T_X$ to track $T_Y$.
Figure 6B:
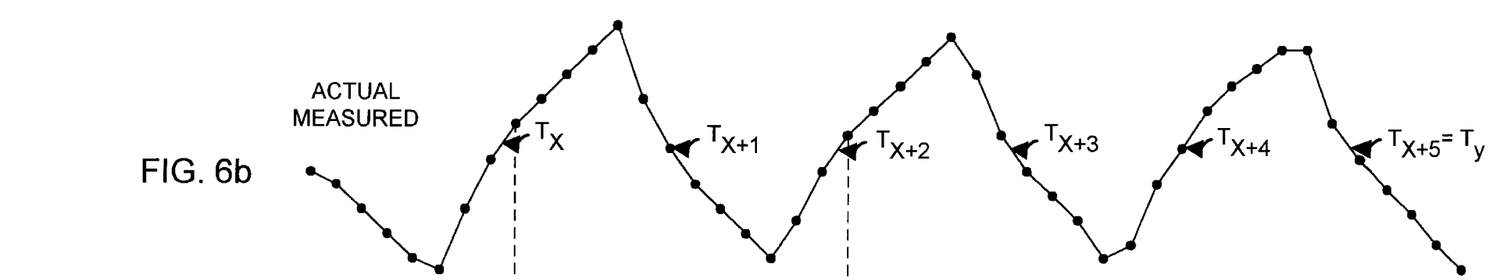
Figure 6C:
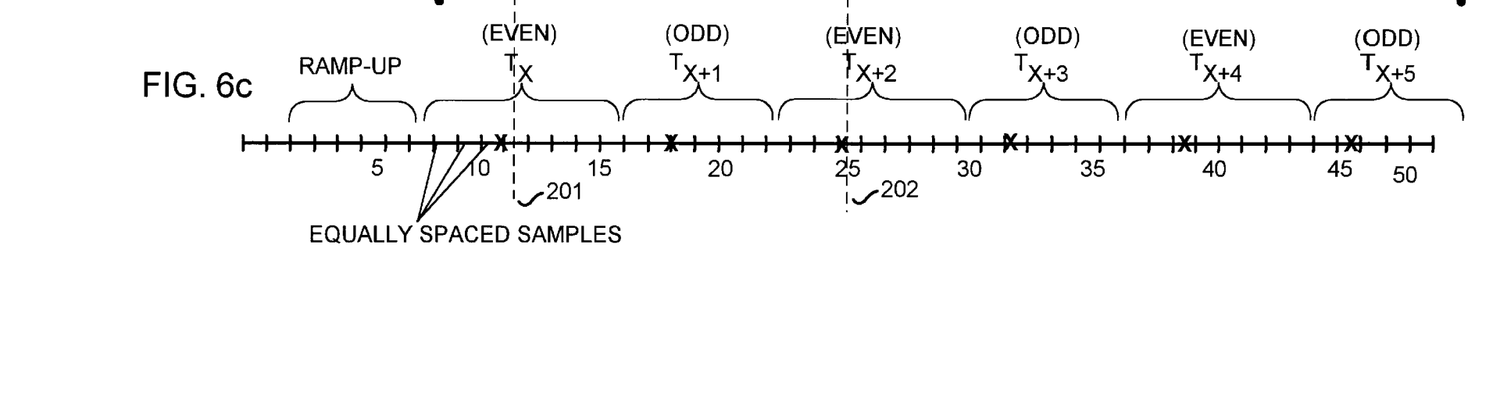

In steps 305 and 306, as suggested by FIGS. 6(b) and 6(c), the PES is sampled at equal time intervals while moving the head at constant velocity over the servo bursts between tracks $T_X$ and $T_Y$. As a result, a plurality of measured PES values are obtained for each track and are recorded in a "Measured PES Table."

Figure 7A:
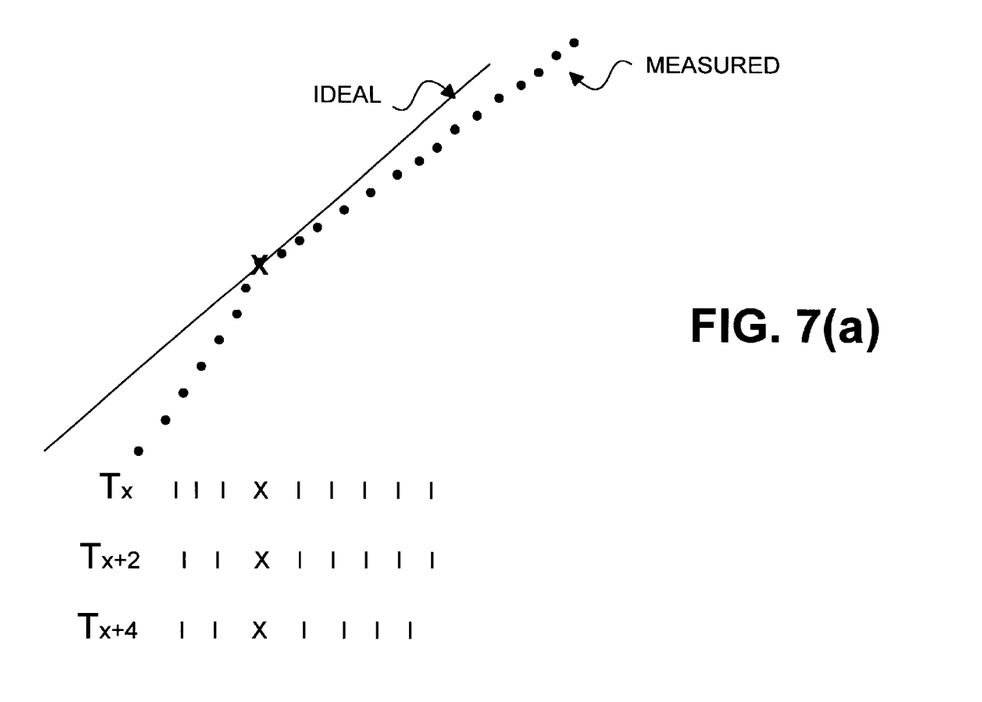
FIGS. 7(a) and 7(b) illustrate the measured PES tables assembled by "overlaying" the measured PES values y obtained as the head moves over even tracks ($T_X$, $T_{X+2}$, $T_{X+4}$) and odd tracks ($T_{X+1}$, $T_{X+3}$, $T_{X+5}$), respectively, in the region of interest from track $T_X$ to track $T_Y$, and the relationship with the ideal PES values for odd and even tracks.
Figure 7B:
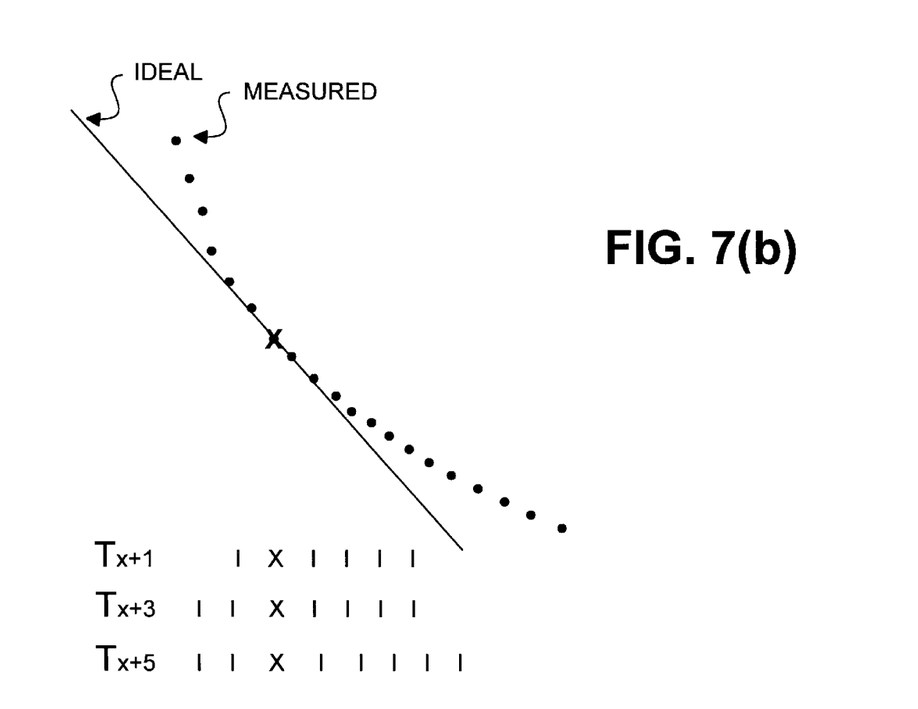

The Measured PES Table contains the measured values corresponding to a plurality of displacements x relative to track center positions of the tracks in the range of interest, $T_X$ to $T_Y$. Because of asymmetry, the measured PES values may be different for even and odd tracks. In such case, it would be necessary to assembled even and odd Measured PES Tables as shown in FIGS. 7(a) and 7(b). The present invention contemplates that the several measurements made for each of the several tracks will be accumulated and "overlaid" into a single table, as suggested by FIGS. 7(a) and 7(b), that relate to displacement from a single, hypothetical track center.

One complication that must be considered are the misalignments between the displacements corresponding to the measured PES values and the several track centers, peaks, and valleys of the ideal PES signal. This misalignment occurs because the PES measurements y are taken at a fixed frequency due to the constant velocity of radial movement. By convention, the head is "on track" when the measured PES is a particular value, e.g. when the PES=0. As can be appreciated from FIG. 6(c), the head will rarely align with a track center during a measurement. In fact, because we measure the PES values at discrete, equal sized, time/displacement intervals the measurements will probably occur at varying displacements x relative to the track center of each track. We will rarely "hit" the successive track centers and measure exactly zero, but more likely will get two non-zero PES measurements corresponding to displacements on either side of each track center, one with a positive PES and one with a negative PES. As shown in FIG. 6(c), for example, the first measurement to the right of Track $T_X$ 201 is 0.1 units away from the track center whereas the first measurement to the right of Track $T_{X+2}$ 202 is 0.4 units away from the track center.

A conventional disk drive is calibrated through other means, however, such that the measured PES y very near the null position where y=0 varies as a substantially linear function actual displacement x, i.e. such that dy/dx=1. Accordingly, as shown in FIG. 6(b), for small variations in the real displacement x to either side of the null position where the PES=0, the gain will deviate from but will remain relatively close to unity. This substantially linear relationship in the vicinity of the track center allows us to interpolate the displacement of one or both of the two "straddling" values relative to the track center. For example, if the first measurement is 0.5 PES units and the second measurement is −0.1 PES units, we know that the head was closer to the track center for the second measurement than for the first measurement. In fact, given our unity gain assumption, we know that the second measurement was taken with the head positioned 0.1 position units away from the track center. Based on this interpolation, we can locate the displacement corresponding to the measured PES of 0.1 PES units, and can immediately determine the displacements for the PES measurements taken on either side of this particular measurement.

In the preferred embodiment, we accurately determine the displacement $X_{NEAR}$ of the closest of the two measurements y which straddle each null position and, based on the displacement $X_{NEAR}$ and the equal spacing, determine the displacements x of the other measurements.

Significantly, as shown in FIGS. 7(a) and 7(b), the $X_{NEAR}$ adjustment process can be applied to multiple track centers, so that multiple tracks may be combined, or "overlayed," in order to obtain more measured PES data for the correction table in a single sweep. The fact that the displacements x may be differently shifted relative to successive track centers is an advantage, in this case, because it provides more data points when the measurements are overlaid.

We will also get two PES measurements on either side of the peak or valley positions. We can easily detect the two measurements on either side of a peak or valley by detecting a change in the sign of the slope and thereby associate one of the measurements with a track center to the left of the peak and the other measurement with the adjacent track center to the right of the peak, as suggested by the end locations of the brackets in FIG. 6(c).

In step 307, the current measured PES values are averaged with the measurements from one or more previous passes.

This multiple pass approach is optional, but is preferred in order to obtain several PES measurements y for a given displacement x and thereby average out random errors introduced by non-repetitive runout and "windage".

In step 308, a counter is tested to see if the desired number of passes "N" has been reached. If NO, then processing loops back to step 303. If YES, then processing proceeds to step 309.

In step 309, a table of correction values is created by comparing the table of measured values with the table of ideal PES values.

Finally, in step 310, the table of correction values are used to convert a measured PES value to a corrected PES value while "micro-jogging" or, in other words, while track following away from the measured track center.

Figure 8A:
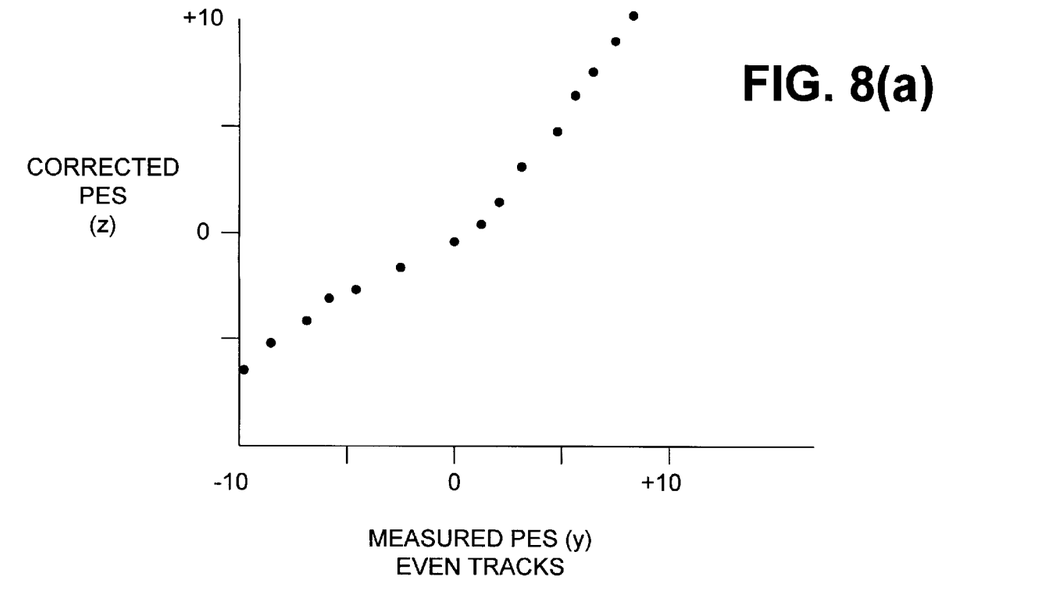
FIGS. 8(a) and 8(b) graphically illustrate odd and even correction tables, respectively, wherein a measured PES value y input on the horizontal axis results in a corrected PES value z from the vertical axis.
Figure 8B:
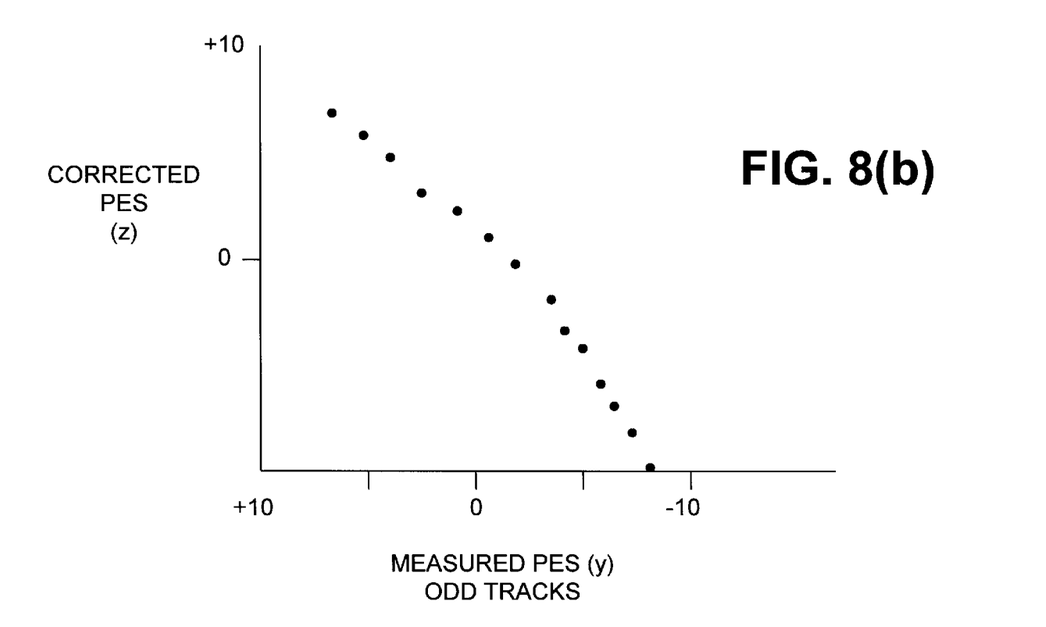

Once we have a plurality of measured PES values for a corresponding plurality of known displacements from each track center, we can develop even and odd correction tables, like those shown in FIGS. 8(a) and 8(b), respectively, which input a measured PES value y and output a corrected PES value z.

Figure 9:
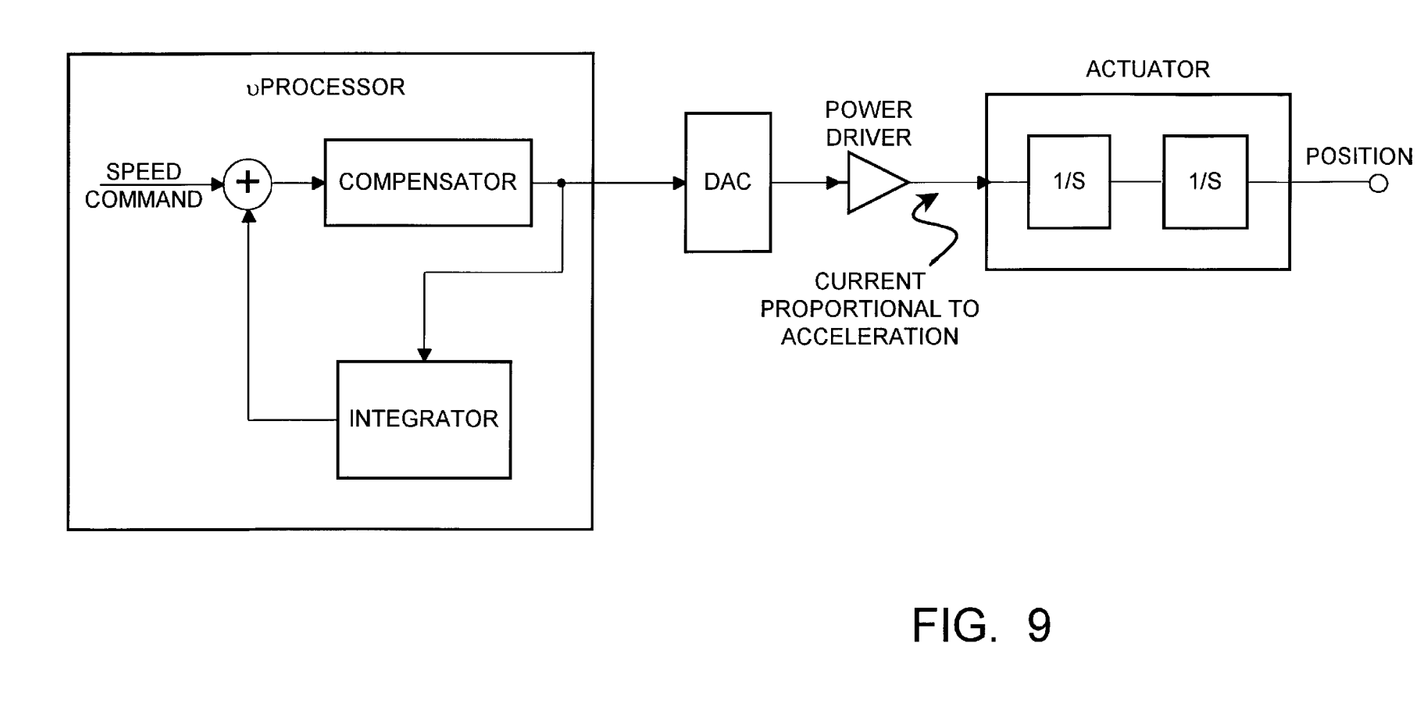
FIG. 9 is a functional block diagram of a control loop which may be used to obtain and maintain a constant velocity by issuing a speed command that is proportional to head acceleration and integrating it over time to obtain a feedback signal that is proportional to velocity.

FIG. 9 shows a preferred method and apparatus for slowly moving the head 140 at constant speed. As shown, the presently preferred approach involves active firmware control where the disk drive microprocessor initiates a speed command. The speed command is summed with the output of an integrator and fed to a compensator. The compensator produces a digital representation of the speed command which is sent to a DAC. The DAC provides an analog input to a power driver which in turn supplies current to the actuator which is proportional to its acceleration. The application of current causes the actuator to produce a change in position. As shown in FIG. 9, the compensator output is integrated and summed with the speed command continuously to provide a feedback loop for constant, controlled velocity at the actuator.

Although FIG. 9 illustrates one way of moving the head, it should be understood that the present invention is not limited to any particular, constant speed drive method. Another possible method, for example, is to fully open the servo loop and then lightly "bump" the head with a one or more current pulses so that it "slews" across the disk. Provided that the countervailing forces such as windage and bias are relatively small, this approach would provide substantially constant speed for a short distance.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A method of calibrating a nonlinear output signal generated by a transducer head in a magnetic disk drive to displacement of the transducer head relative to a data track center of a data track containing standard servo data, the method comprising:

positioning a transducer head on a track center of a first data track such that the PES produced by reading standard servo data included in the data track is zero;

moving the transducer head at a constant velocity of radial movement over a plurality of data tracks from the track center of the first data track to a track center of a second data track, the constant velocity being sufficiently slow in relation to the rotational speed of the disk that the transducer head repeatedly passes over the standard servo data included in each of the plurality of data tracks located between the track center of the first data track and the track center of the second data track;

tracking the passage of time;

determining the constant velocity of radial movement;

identifying a plurality of transducer head positions between the track center of the first data track and the track center of the second data track based on the passage of time and the determined velocity of radial movement;

measuring nonlinear output signals generated by the transducer head at the plurality of transducer head positions;

comparing the nonlinear output signals to desired signals at the plurality of transducer head positions; and generating a correction table for use in determining an actual position of the transducer head relative to a data track center given only the nonlinear output signal.

2. A method as defined in claim 1 wherein the step of determining the constant velocity of radial movement comprises dividing a distance value corresponding to a distance traversed by the transducer head at it was moved between the track center of the first data track and the track center of the second data track by a time value corresponding to the passage of time.

3. A method as defined in claim 1 further comprising the step of compensating for a time needed for the transducer head to ramp up to the constant velocity.

4. A method as defined in claim 3 wherein the step of compensating for the ramp up to constant velocity comprises positioning the transducer head in advance of the first data track.

5. A method as defined in claim 1 wherein the transducer head is carried by an actuator, wherein a voice coil motor accelerates the actuator in proportion to a drive current selected with a speed command, and wherein the step of moving the transducer head at a constant velocity of radial movement comprises:

generating a desired speed command;

integrating the desired speed command to provide a velocity feedback signal that is proportional to the velocity of the actuator and the transducer head; and subtracting the velocity feedback signal from the desired speed command in a feedback loop to maintain the constant velocity.

6. A method of calibrating a nonlinear output signal generated by a transducer head in a magnetic disk drive to displacement of the transducer head relative to a data track center of a data track containing standard servo data, the method comprising:

moving the transducer head over a plurality of tracks at a constant velocity of radial movement that is sufficiently slow in relation to the rotational speed of the disk that the transducer head repeatedly passes over the standard servo data included in the data track;

tracking the passage of time;

determining the constant velocity of radial movement;

identifying a plurality of transducer head positions relative to a track center of each of the plurality of tracks based on the passage of time and the determined constant velocity of radial movement;

measuring nonlinear output signals generated by the transducer head at the plurality of transducer head positions;

comparing the nonlinear output signals to desired signals at the plurality of transducer head positions; and generating a correction table for use in determining an actual position of the transducer head relative to a data track center given only the nonlinear output signal.

* * * * *